US006852066B2

(12) United States Patent
Senger et al.

(10) Patent No.: US 6,852,066 B2
(45) Date of Patent: Feb. 8, 2005

(54) DRIVE UNIT FOR A VEHICLE

(75) Inventors: Karl-Heinz Senger, Farmington Hills, MI (US); Peter Baeuerle, Ludwigsburg (DE); Bram Veenhuizen, Goirle (NL); Engbert Spijker, Helmond (NL); Gert-Jan Van Spijk, Drunen (NL)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 10/130,161

(22) PCT Filed: Sep. 12, 2001

(86) PCT No.: PCT/DE01/03495

§ 371 (c)(1),
(2), (4) Date: Nov. 15, 2002

(87) PCT Pub. No.: WO02/23030

PCT Pub. Date: Mar. 21, 2002

(65) Prior Publication Data

US 2003/0125162 A1 Jul. 3, 2003

(30) Foreign Application Priority Data

Sep. 15, 2000 (DE) ........................................ 100 45 759

(51) Int. Cl.[7] ........................ B60K 41/02; G06F 19/00; G06F 7/70

(52) U.S. Cl. ........................................ 477/181; 701/101

(58) Field of Search ................................ 477/174–175, 477/181, 90, 83, 84; 701/101, 67, 68

(56) References Cited

U.S. PATENT DOCUMENTS

| | | | | | |
|---|---|---|---|---|---|
| 4,343,387 | A | * | 8/1982 | Hofbauer | 477/89 |
| 5,378,211 | A | | 1/1995 | Slicker et al. | |
| 6,033,342 | A | | 3/2000 | Steinel et al. | |
| 6,701,241 | B2 | * | 3/2004 | Senger et al. | 701/67 |

FOREIGN PATENT DOCUMENTS

| | | |
|---|---|---|
| DE | 198 23 764 | 12/1998 |
| EP | 0 875 673 | 11/1998 |

* cited by examiner

*Primary Examiner*—Tisha Lewis
(74) *Attorney, Agent, or Firm*—Kenyon & Kenyon

(57) ABSTRACT

A drive unit for a vehicle including at least one drive wheel is provided, the drive unit having an internal combustion engine, and, between the internal combustion engine and the at least one drive wheel, a clutch for transmitting a torque between the internal combustion engine and the drive wheel, as well as a vehicle control for controlling or regulating the internal combustion engine as a function of the speed of the clutch on the side of the internal combustion engine and/or as a function of the speed of the clutch on the side of the drive wheel.

13 Claims, 6 Drawing Sheets

DRIVE UNIT FOR A VEHICLE

FIELD OF THE INVENTION

The present invention relates to a drive unit for a motor vehicle having at least one drive wheel, the drive unit having an internal combustion engine and having, situated between the internal combustion engine and the at least one drive wheel, a clutch for transferring a torque between the internal combustion engine and the drive wheel. The present invention also relates to a method and a control system for operating such a drive unit.

SUMMARY OF THE INVENTION

The object of the present invention is to improve such a drive train and the operation of such a drive train.

This object is achieved by a method and a drive unit and a vehicle control. In this context, the internal combustion engine is controlled or regulated as a function of the clutch speed on the side of the internal combustion engine and/or the clutch speed on the side of the drive wheel and/or as a function of the time derivative of the clutch speed on the side of internal combustion engine and/or as a function of the time derivative of the clutch speed on the side of the drive wheel in order to operate a drive unit for a vehicle having at least one drive wheel, the drive unit having an internal combustion engine and having, situated between the internal combustion engine and the at least one drive wheel, a clutch for transferring a torque between the internal combustion engine and the drive wheel. In this manner, among other things, a particularly advantageous restriction of the torque surges in the drive unit is achieved. Particularly in connection with a continuously variable transmission, an especially good protection of this continuously variable transmission is achieved in this manner. The ride comfort is also increased.

In an advantageous embodiment of the present invention, a setpoint value for the torque of the internal combustion engine is determined as a function of the time derivative of the clutch speed on the side of the internal combustion engine and/or as a function of the time derivative of the clutch speed on the side of the drive wheel.

In another advantageous embodiment of the present invention, the internal combustion engine is controlled or regulated as a function of the setpoint value.

In a further advantageous embodiment of the present invention, the speed of the internal combustion engine is restricted.

In another embodiment of the present invention, the setpoint value is a maximum value that is not to be exceeded.

In a further advantageous embodiment of the present invention, the torque of the internal combustion engine is restricted when $$\frac{dn_E}{dt} \geq n_{Elim1}$$

where $n_E$ is the speed of the clutch on the side of the internal combustion engine and $n_{Elim1}$ is the predefined limiting value, and/or when $$\frac{dn_A}{dt} \geq n_{Alim1}$$

where $n_A$ is the speed of the clutch on the side of the drive wheel and $n_{Alim1}$ is a predefined limiting value.

( )/dt indicates the time derivative.

In a further advantageous embodiment of the present invention, the restriction of the torque of the internal combustion engine is ended when $$n_{E0} - n_E < n_{Elim2}$$

where $n_{Elim2}$ is a predefined limiting value and $n_{E0}$ is the speed of the clutch on the side of the internal combustion engine at the instant at which the restriction was started, and/or when $$n_{A0} - n_A < n_{Alim2}$$

where $n_{Alim2}$ is a predefined limiting value and $n_{A0}$ is the rotational speed of the clutch on the side of the drive wheel at the instant at which the restriction was started.

DETAILED DESCRIPTION

Figure 1:
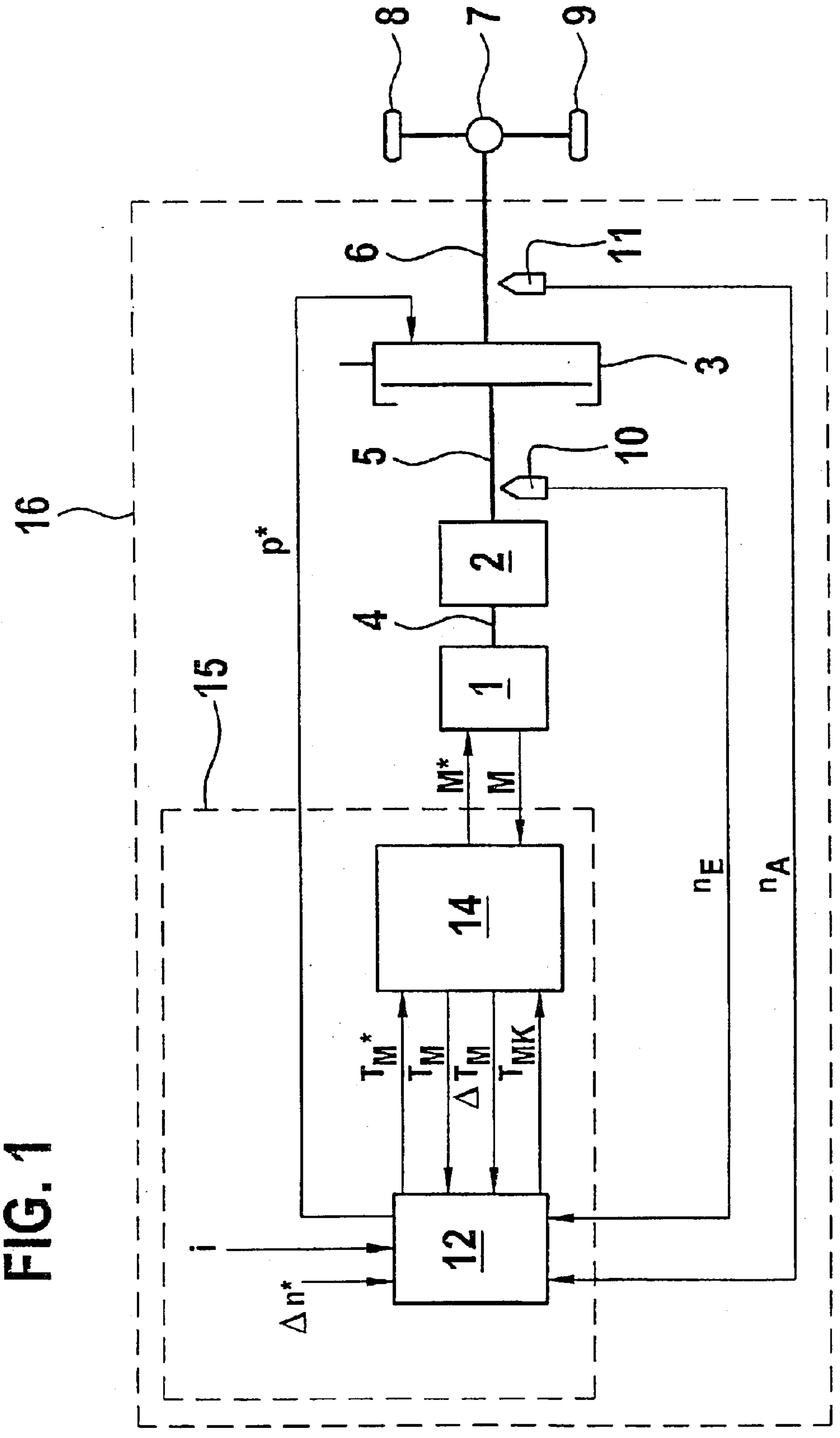
FIG. 1 is a block diagram of a drive unit for a motor vehicle.

FIG. 1 shows a drive unit 16 for a motor vehicle. In this context, reference numeral 1 denotes an internal combustion engine, which is connected by a shaft 4 to an automatic transmission 2. Automatic transmission 2 is advantageously designed as a continuously variable transmission. Automatic transmission 2 is connected to drive wheels 8, 9 via a clutch input shaft 5, a clutch 3, a clutch output shaft 6, and a differential 7, in order to drive the motor vehicle. The torque transmitted by clutch 3 is able to be adjusted by pressing clutch 3 together with a clamping load p. To adjust the torque transmitted by clutch 3, a clutch control 12 is provided, which sets the clamping load in clutch 3 in response to the input of a setpoint clamping load p*. The clamping load is synonymous with the clamping force used to press clutch 3 together.

Input variables for clutch control 12 include rotational speed $n_E$ of clutch input shaft 5, which is measured by a speed sensor 10, rotational speed $n_A$ of clutch output shaft 6, which is measured by a speed sensor 11, transmission ratio i of automatic transmission 2, and a setpoint value Δn* for the clutch slip of clutch 3 (setpoint clutch slip), as well as optionally torque $T_M$ of internal combustion engine 1 and information $\Delta T_M$ about the inaccuracy of the information regarding torque $T_M$ of internal combustion engine 1.

Clutch slip Δn is defined as $$\Delta n = n_E - n_A$$

For example, torque $T_M$ of internal combustion engine 1 as well as information $\Delta T_M$ regarding the inaccuracy of the information about torque $T_M$ of internal combustion engine 1 are provided by an engine control 14. A setpoint value $T_M^*$ as well as an optional corrected engine torque $T_{MK}$, which is a corrected value for the actual value of torque $T_M$ of internal combustion engine 1, are transmitted from clutch control 12 to engine control 14.

Engine control 14 uses manipulated variables M* to control and regulate internal combustion engine 1. Actual engine values M are optionally transmitted from internal combustion engine 1 to engine control 14.

In an exemplary embodiment, engine control 14 and clutch control 12 are part of a vehicle control 15. This may also have a transmission control (not shown) for controlling and regulating automatic transmission 2 as well as a superordinate control system for coordinating automatic transmission 2, internal combustion engine 1, and clutch 3. The superordinate control system provides, for example, transmission ratio i of automatic transmission 2 and setpoint slip Δn* for clutch 3.

Figure 2:
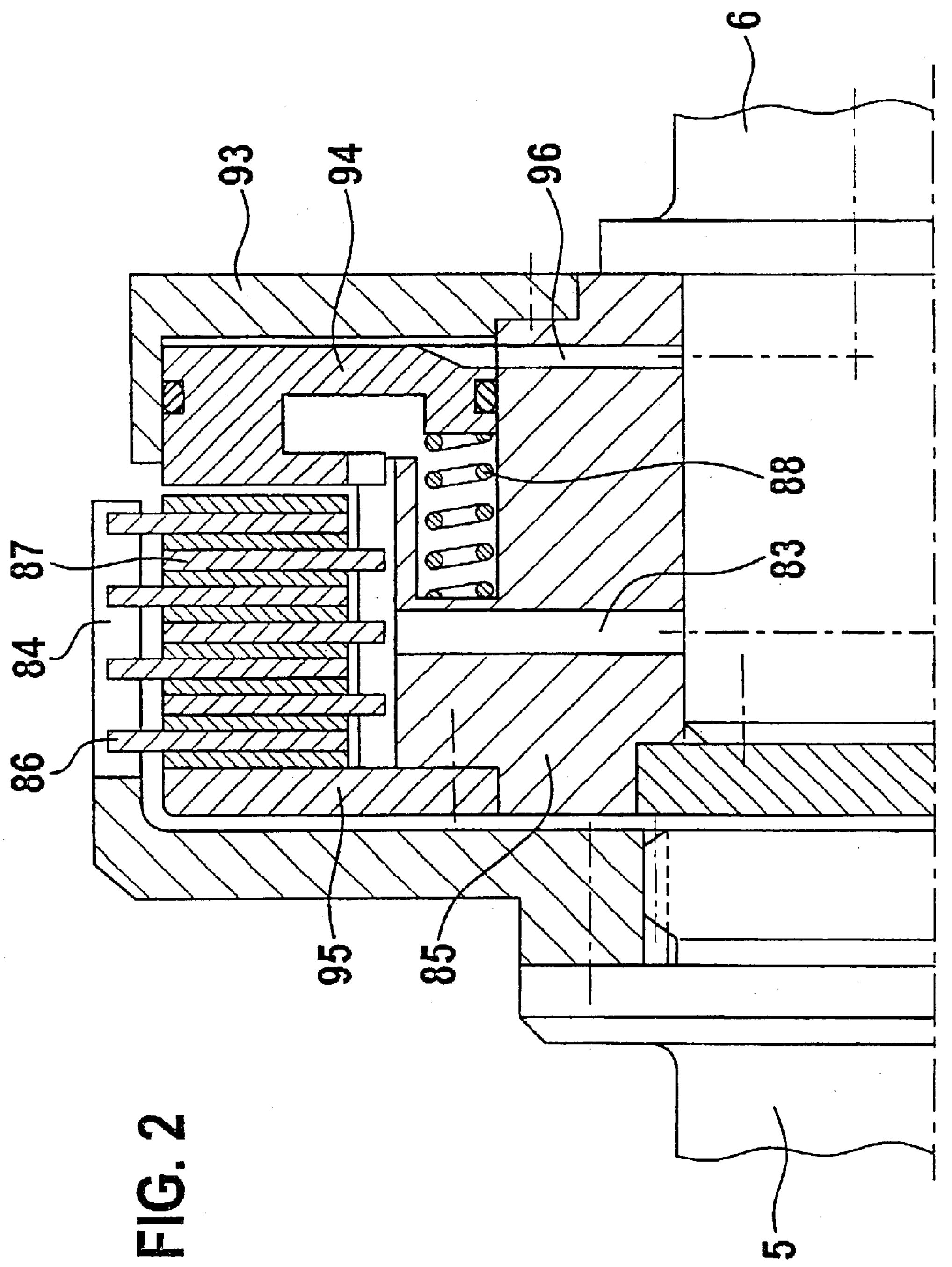
FIG. 2 illustrates a sectional view of a clutch.

FIG. 2 shows an exemplary embodiment of a clutch 3. In this context, reference numeral 83 denotes a lubricating-oil supply line for hydraulic oil, reference numeral 84 denotes an external driver, reference numeral 85 an internal driver, reference numeral 86 an external disk, reference numeral 87 an internal disk, reference numeral 88 a restoring spring, reference numeral 93 a cylinder, reference numeral 94 a piston, reference numeral 95 a pressure plate, and reference numeral 96 denotes a pressurized-media supply line. External disks 86, which, in an advantageous refinement, are steel disks not having a friction lining, are positioned at external driver 84, which is connected to clutch input shaft 5. Internal driver 85, which is connected to clutch output shaft 6, receives internal disks 87, which are coated with a friction lining. When hydraulic oil is introduced into cylinder 93 through pressurized-media supply line 96 at a defined pressure level, piston 94 moves in opposition to the force of restoring spring 88, in the direction of pressure plate 95, and presses together the disk stack, which includes internal and external disks 87 and 86. In order to cool the disk stack, hydraulic oil is directed through lubricating-oil supply line 83 to internal and external disks 87 and 86.

Figure 3:
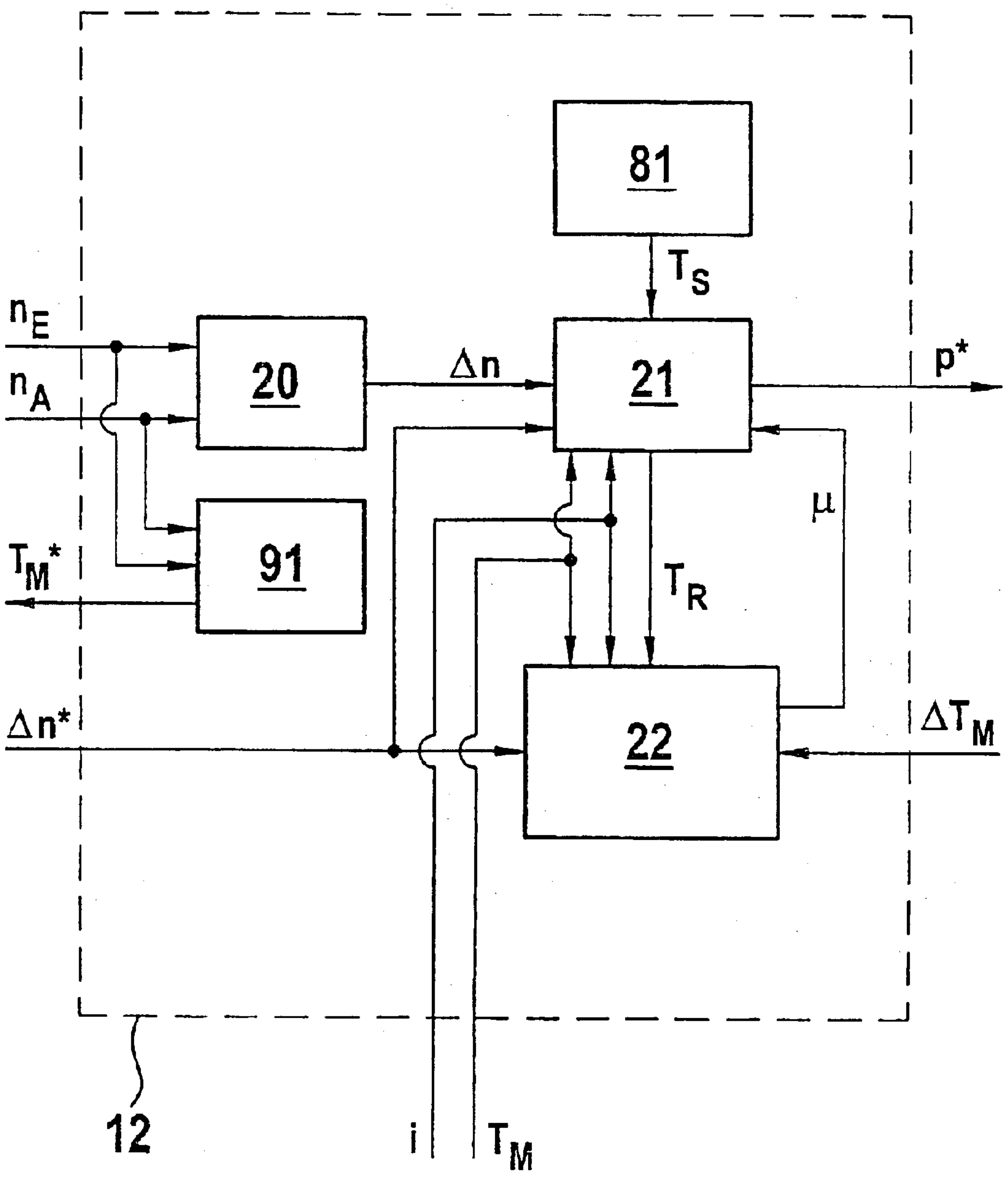
FIG. 3 is a block diagram a of clutch control.

FIG. 3 shows a detailed view of clutch control 12. It has a differentiator 20, a slip controller 21, as well as an adapter 22. Slip controller 21 is explained in greater detail in FIG. 6. Differentiator 20 calculates clutch slip Δn, which is an input variable that is input into slip controller 21. Other input variables of slip controller 21 included among other things setpoint clutch slip Δn*, engine torque $T_M$, transmission ratio i of automatic transmission 2, and friction coefficient $\mu$. Friction coefficient $\mu$ is calculated by adapter 22. The input variables for adapter 22 include setpoint clutch slip Δn*, transmission ratio i of automatic transmission 2, torque $T_M$ of internal combustion engine 1, information $\Delta T_M$ regarding the inaccuracy of the information about torque $T_M$ of internal combustion engine 1, as well as a differential torque $T_R$, which is calculated by slip controller 21. Apart from coefficient of friction $\mu$, a corrected engine torque $T_{MK}$ is an additional output variable of adapter 22. Slip controller 21 also calculates setpoint clamping load p*.

Clutch control 12 also has a protective device 81 for protecting drive unit 16, in particular automatic transmission 2, from torque surges. The output variable of protective device 81 is a surge torque $T_s$. In an advantageous refinement, surge torque $T_s$ is calculated according to $$T_s = T_c - \sum_l J_l \cdot \frac{2\pi - \Delta n_{\max}}{\Delta t}$$

in which

- $J_1$ is the moment of inertia of the $1^{th}$ drive-unit component, on the side of clutch 3 on which internal combustion engine 1 is situated;
- $\Delta n_{max}$ is the maximum allowable clutch slip;
- $T_c$ is a constant torque; and
- Δt is the period of time, in which a torque surge leads to an increase in the slip.

Automatic transmission 2 may be damaged by so-called torque surges, which are introduced into the drive unit in particular by drive wheels 8 and 9. In this case, it is particularly critical, for example, to protect a variator of a CVT (continuously variable transmission). Brief slippage of such a continuously variable transmission due to a torque surge may already result in permanent damage to the continuously variable transmission. Such torque surges occur, for example, in response to passing over from a road-surface covering having a low coefficient of friction to a road-surface covering having a high coefficient of friction. Examples include transitioning from an ice-covered road surface to a dry road surface or driving over railroad tracks.

If slip time Δt is not significant, then surge torque $T_s$ is able to be set equal to constant torque $T_C$.

An advantageous refinement provides for surge torque $T_s$ to be transmitted to a transmission control, so that, e.g. the clamping load in a continuously variable transmission is able to be increased accordingly. The necessary clamping load in the continuously variable transmission is to be increased as a function of surge torque $T_s$.

A protective device 81, as explained by way of example, is particularly advantageously used in combination with the present invention. In an exemplary implementation of the present invention, clutch control 12 has an engine torque setpoint adjuster 91. In this context, engine-torque setpoint adjuster 91 outputs a setpoint value $T_M$* for the torque of internal combustion engine 1, the setpoint value for the engine torque being supplied to engine control 14 in an exemplary embodiment. Apart from a torque input, setpoint engine torque $T_M$* may also be specified by an ignition-advance angle input or by a limiting value for the engine speed. In this context, value $T_M$* is advantageously a maximum value for restricting the torque of internal combustion engine 1.

Figure 4:
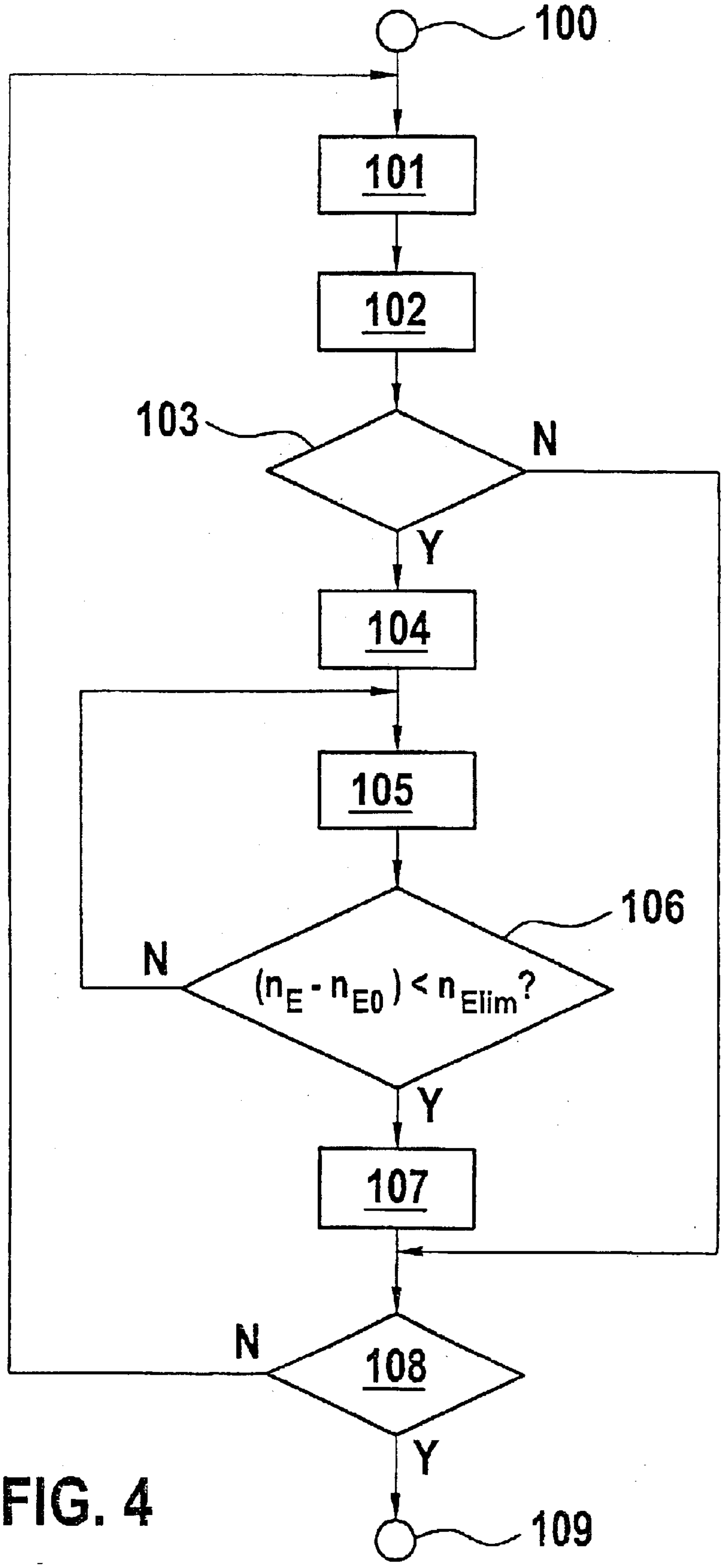
FIG. 4 is a flowchart for an engine-torque setpoint adjuster.
Figure 5:
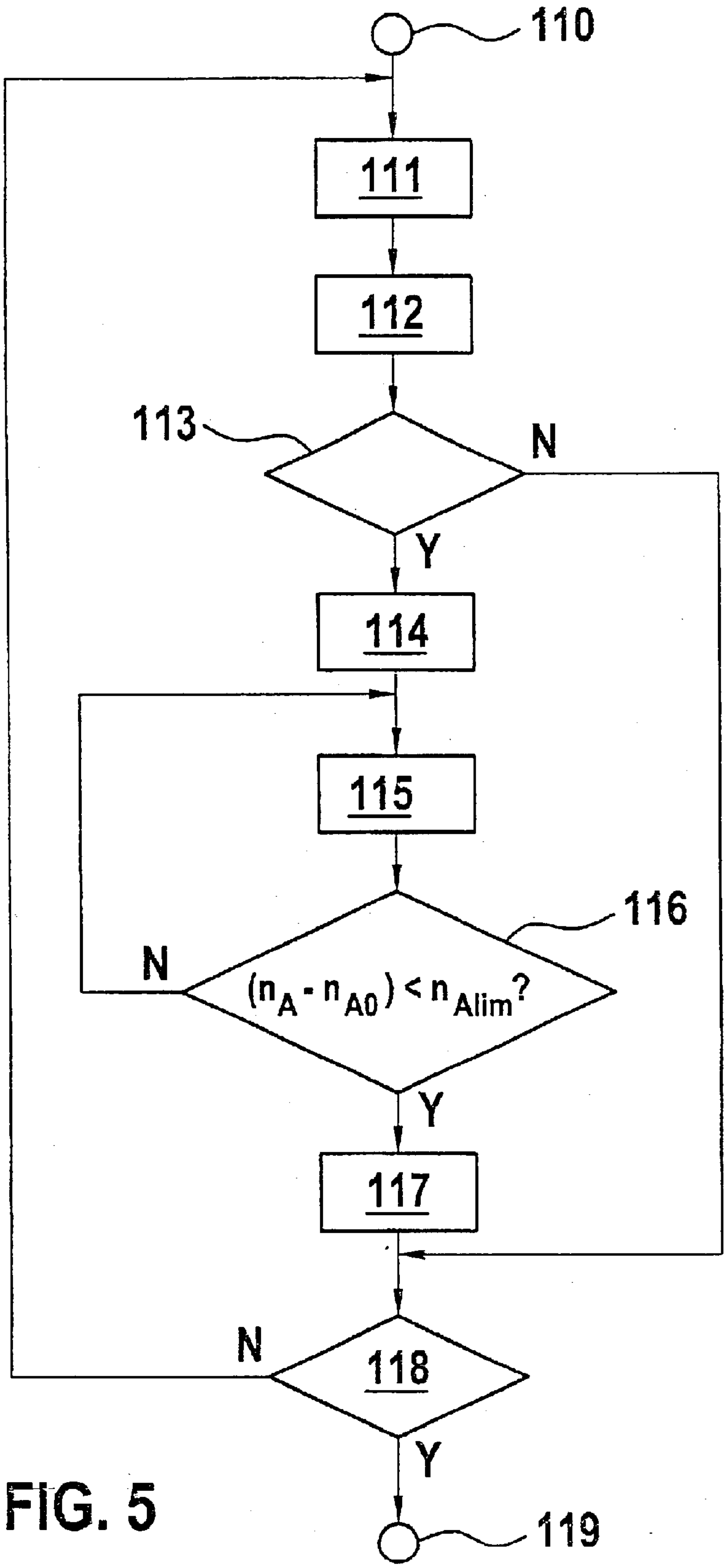
FIG. 5 is another flowchart for an engine-torque setpoint adjuster.

FIGS. 4 and 5 show flow charts, which, in an exemplary embodiment, are each implemented individually or jointly on engine-torque setpoint adjuster 91. In this context, reference numerals 100 and 109 in FIG. 4 designate the beginning of the flow chart and the end of the flow chart, respectively. The functional sequence begins with a step 101, in which input clutch speed $n_E$ is input. In a further step 102, derivative $dn_E/dt$ of input clutch speed $n_E$ is calculated. Step 102 is followed by query 103, which checks if $$\frac{dn_E}{dt} \geq n_{Elim1}$$

in which $n_{Elim1}$ is a preselected limiting value. If this condition is satisfied, then a value $n_{E0}$ is calculated in step 104, where $$n_{E0} = n_E$$

Engine torque $T_M$ of internal combustion engine 1 is restricted in a further step 105. To that end, a corresponding setpoint value $T_M$* is output, which may include a torque input, an ignition-advance-angle input, or a restriction of the maximum engine speed of internal combustion engine 1 (see above). In step 105, a new value of $n_E$ is input. In addition, step 105 is followed by query 106, which checks if $$n_{E0} - n_E < n_{Elim2}$$

in which $n_{Elim2}$ is a preselected limiting value. If the query is not fulfilled, then step 105 is executed again. However if the query is satisfied, then step 107 follows in which the restriction of the engine torque is canceled. In other words, there is no torque input, ignition-advance-angle input, or restriction of the maximum engine speed. Step 107 is followed by a query 108, which checks whether the functional sequence should be ended. If the sequence is not to be ended, then step 101 is executed again. Otherwise, the sequence is ended.

If the condition $$\frac{dn_E}{dt} \geq n_{Elim1}$$

of query 103 is not fulfilled, then it is followed by query 108.

Reference numerals 110 and 119 in FIG. 5 designate the beginning of the sequence and the end of the sequence, respectively. The functional sequence begins with a step 111, in which output clutch speed $n_A$ is input. In an additional step 112, derivative $dn_A/dt$ of output clutch speed $n_A$ is calculated. Step 112 is followed by query 113, which checks if $$\frac{dn_A}{dt} \geq n_{Alim1}$$

in which $n_{Alim1}$ is a preselected limiting value. If this condition is satisfied, then a value $n_{A0}$ is calculated in step 114, where $$n_{A0}=n_A$$

Engine torque $T_M$ of internal combustion engine 1 is limited in an additional step 115. To that end, a corresponding setpoint value $T_M$* is output, which may include a torque input, an ignition-advance-angle input, or a restriction of the maximum engine speed of internal combustion engine 1 (see above). In step 113, a new value of $n_A$ is input. Step 115 is followed by query 116, which checks if $$n_{A0}-n_A<n_{Alim2}$$

in which $n_{Alim2}$ is a preselected limiting value. If the query is not fulfilled, then step 115 is executed again. However, if the query is satisfied, a step 117 follows in which the restriction of the engine torque is eliminated, i.e., there is no torque input, ignition-advance-angle input, or restriction of the maximum engine speed. Step 117 is followed by an query 118, which checks if the functional sequence should be ended. If the sequence should not be ended, then step 111 is executed again. Otherwise, the sequence is ended.

If the condition $$\frac{dn_A}{dt} \geq n_{Alim1}$$

of query 113 is not satisfied, then it is followed by query 118.

Figure 6:
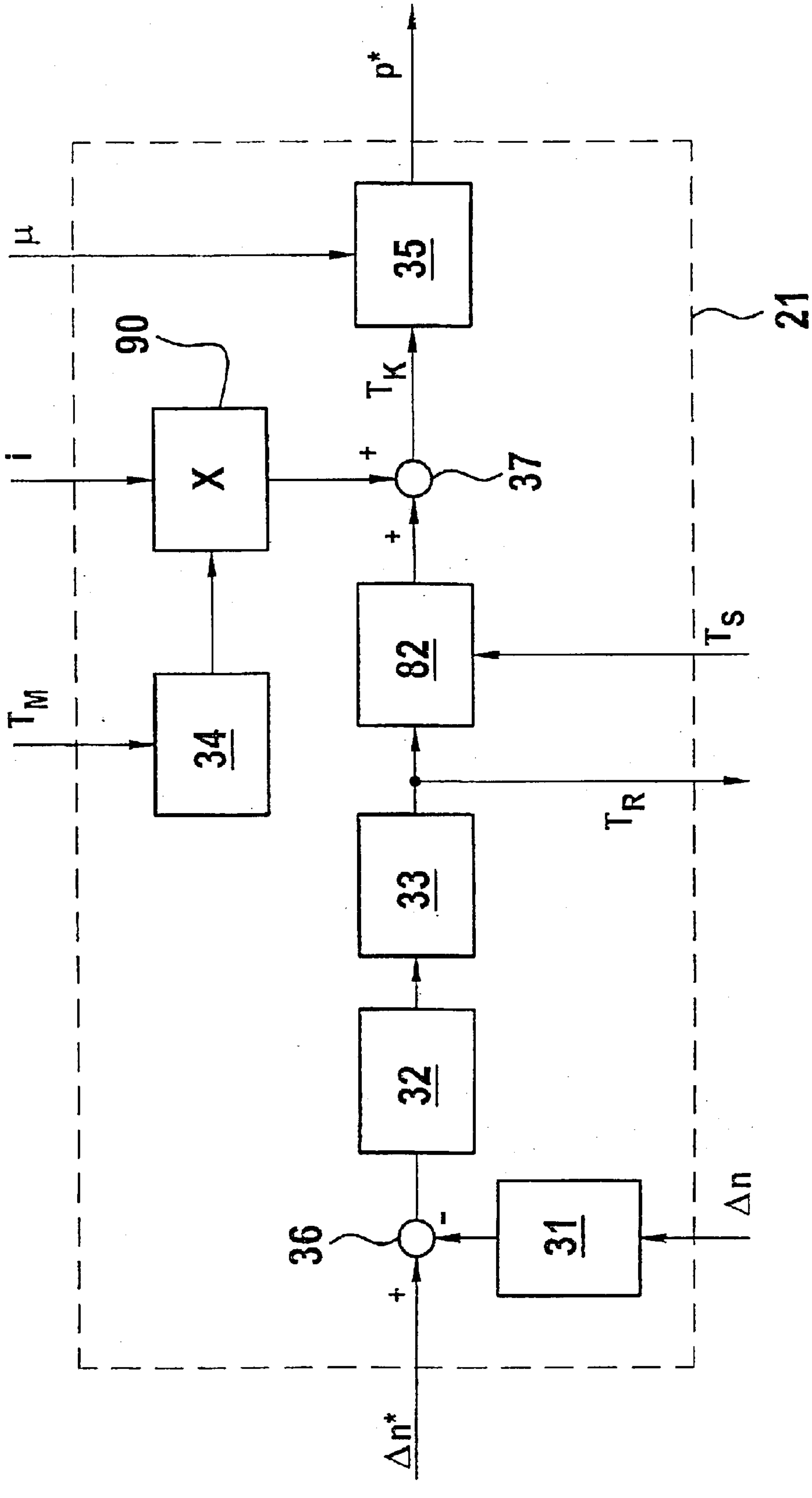
FIG. 6 is block diagram of a slip controller.

FIG. 6 shows the inner design of slip controller 21. Slip controller 21 has a filter 31 for filtering clutch slip Δn. The difference between setpoint clutch slip Δn* and clutch slip Δn filtered by filter 31 is calculated by summer 36. This difference is negated by negator 32 and is the input variable for a controller 33, which is designed as a PID controller in an advantageous refinement. The output variable of controller 33 is differential torque $T_R$.

Using a filter 34, engine torque $T_M$ is filtered and is multiplied by transmission ratio i of automatic transmission 2 using a multiplier 90. A summer 37 adds the product of engine torque $T_M$ and the transmission ratio of automatic transmission 2 to the output of a minimum generator 82, which compares differential torque $T_R$ and surge torque $T_s$ and outputs the lesser torque as the output value. The sum of the product of engine torque $T_M$ and transmission ratio i of automatic transmission 2 and the maximum of differential torque $T_R$ and surge torque $T_s$ is clutch torque $T_k$ to be transmitted by clutch 3, the clutch torque, together with friction coefficient $\mu$, being an input value for an inverse clutch model 35. The following equation is implemented in an exemplary embodiment of inverse clutch model 35:

$$p^* = \frac{1}{A_R}\left(\frac{T_K}{\mu \cdot r \cdot Z_R} + F_0\right)$$

In this context, $A_R$ is the piston area of clutch 3, r is the effective friction radius of clutch 3, $Z_R$ is the number of friction surfaces of clutch 3, and $F_0$ is the minimum force necessary for clutch 3 to transmit torque.

What is claimed is:

1. A method for operating a drive unit of a vehicle, the drive unit including at least one drive wheel, an internal combustion engine, and a clutch situated between the internal combustion engine and the at least one drive wheel, the clutch being operable to transmit a torque between the internal combustion engine and the drive wheel, the method comprising:

one of controlling and regulating the internal combustion engine as a function of at least one of a speed of the clutch on a side of the internal combustion engine and a speed of the clutch on a side of the drive wheel;

wherein the internal combustion engine is one of controlled and regulated as a function of at least one of a time derivative of the speed of the clutch on the side of the internal combustion engine and a time derivative of the speed of the clutch on the side of the drive wheel.

2.The method according to claim 1, further comprising the step of:

determining a setpoint value for a torque of the internal combustion as a function of at least one of the speed of the clutch on the side of the internal combustion engine and the speed of the clutch on the side of the drive wheel.

3. The method according to claim 2, wherein the internal combustion engine is one of controlled and regulated as a function of the setpoint value.

4. The method according to claim 2, wherein the torque of the internal combustion engine is restricted and the setpoint value is a maximum value that may not be exceeded.

5. A method for operating a drive unit of a vehicle, the drive unit including at least one drive wheel, an internal combustion engine, and a clutch situated between the internal combustion engine and the at least one drive wheel, the clutch being operable to transmit a torque between the internal combustion engine and the drive wheel, the method comprising:

one of controlling and regulating the internal combustion engine as a function of at least one of a speed of the clutch on a side of the internal combustion engine and a speed of the clutch on a side of the drive wheel; and determining a setpoint value for a torque of the internal combustion as a function of at least one of the speed of the clutch on the side of the internal combustion engine and the speed of the clutch on the side of the drive wheel;

wherein the torque of the internal combustion engine is restricted when at least one of:

$$\frac{dn_E}{dt} \geq n_{Elim1}$$

wherein $n_E$ is the speed of the clutch on the side of the internal combustion engine and $n_{Elim1}$ is a predefined limiting value; and $$\frac{dn_A}{dt} \geq n_{Alim1}$$

wherein $n_A$ is the speed of the clutch on the side of the drive wheel and $n_{Alim1}$ is a predefined limiting value.

6. The method according to claim 5, wherein the restriction of the torque of the internal combustion engine is ended when at least one of:

$$n_{E0}-n_E 21\ n_{Elim2}$$

wherein $n_{Elim2}$ is a predefined limiting value and $n_{E0}$ is the speed of the clutch on the side of the internal combustion engine at an instant at which the restriction of the torque is started; and $$n_{A0}31\ n_A 21\ n_{Alim2}$$

wherein $n_{Alim2}$ is a predefined limiting value and $n_{A0}$ is the speed of the clutch on the side of the drive wheel at the instant at which the restriction of the torque is started.

7. A method for operating a drive unit for a vehicle, the drive unit including at least one drive wheel, an internal combustion engine, and a clutch situated between the internal combustion engine and the at least one drive wheel, the clutch being operable to transmit a torque between the internal combustion engine and the drive wheel, the method comprising the step of:

one of controlling and regulating the internal combustion engine as a function of at least one of a time derivative of a speed of the clutch on a side of the internal combustion engine and a time derivative of a speed of the clutch on a side of the drive wheel; and determining a setpoint value for a torque of the internal combustion engine as a function of at least one of the time derivative of the speed of the clutch on the side of the internal combustion engine and the time derivative of the speed of the clutch on the side of the drive wheel.

8. The method according to claim 7, wherein the internal combustion engine is one of controlled and regulated as a function of the setpoint value.

9. The method according to claim 8, wherein the torque of the internal combustion engine is restricted and the setpoint value is a maximum value that may not be exceeded.

10. The method according to claim 7, wherein the torque of the internal combustion engine is restricted when at least one of:

$$\frac{dn_E}{dt} \geq n_{Elim1}$$

wherein $n_E$ is the speed of the clutch on the side of the internal combustion engine and $n_{Elim1}$ is a predefined limiting value; and $$\frac{dn_A}{dt} \geq n_{Alim1}$$

wherein $n_A$ is the speed of the clutch on the side of the drive wheel and $n_{Alim1}$ is a predefined limiting value.

11. The method according to claim 10, wherein the restriction of the torque of the internal combustion engine is ended when at least one of:

$$n_{E0}-n_E<n_{Elim2}$$

wherein $n_{Elim2}$ is a predefined limiting value and $n_E$ is the speed of the clutch on the side of the internal combustion engine at an instant at which the restriction of the torque is started; and $$n_{A0}-n_A<n_{Alim2}$$

wherein $n_{Alim2}$ is a predefined limiting value and $n_{A0}$ is the speed of the clutch on the side of the drive wheel at the instant at which the restriction of the torque is started.

12. A drive unit for a vehicle having at least one drive wheel, comprising:

an internal combustion engine;

a clutch situated between the internal combustion engine and the at least one drive wheel, the clutch being operable to transmit a torque between the internal combustion engine and the drive wheel; and a controller for one of controlling and regulating the internal combustion engine as a function of at least one of a time derivative of a speed of the clutch on a side of the internal combustion engine and a time derivative of a speed of the clutch on a side of the drive wheel.

13. A control device for use in connection with a drive unit for a vehicle having at least one drive wheel, an internal combustion engine and a clutch situated between the internal combustion engine and the at least one drive wheel, the clutch being operable to transmit a torque between the internal combustion engine and the drive wheel, comprising:

a controller for one of controlling and regulating the internal combustion engine as a function of at least one of a time derivative of a speed of the clutch on a side of the internal combustion engine and a time derivative of a speed of the clutch on a side of the drive wheel.

* * * * *

UNITED STATES PATENT AND TRADEMARK OFFICE

CERTIFICATE OF CORRECTION

PATENT NO. : 6,852,066 B2
DATED : February 8, 2005
INVENTOR(S) : Karl-Heinz Senger et al.

It is certified that error appears in the above-identified patent and that said Letters Patent is hereby corrected as shown below:

Column 2,
Line 1, change "()/dt indicates the time derivative." to -- d()/dt indicates the time derivative. --.

Column 3,
Line 5, change "In an exemplary embodiment," to -- In an exemplary embodiment according to the present invention, --.

Column 4,
Line 56, change "104, where" to -- 104, in which --.

Column 7,
Line 22, change "$n_{EO}$-$n_{E}^{21}$ $n_{Elim2}$" to -- $n_{EO}$-$n_{E}$< $n_{Elim2}$ --.
Line 26, change "$n_{AO}$-$n_{A}^{21}$ $n_{A\ lim2}$" to -- $n_{AO}$-$n_{A}$< $n_{Alim2}$ --.

Signed and Sealed this

Sixteenth Day of May, 2006

JON W. DUDAS
*Director of the United States Patent and Trademark Office*